United States Patent [19]

Mayo

[11] Patent Number: 5,799,832
[45] Date of Patent: Sep. 1, 1998

[54] FROZEN DESSERT AND DRINK DISPENSER AND METHOD

[75] Inventor: Colin H. Mayo, Mesa, Ariz.

[73] Assignee: Mesa Technologies, Inc., Chandler, Ariz.

[21] Appl. No.: 627,980

[22] Filed: Apr. 4, 1996

[51] Int. Cl.[6] .............................. A23G 9/04; A23G 9/28
[52] U.S. Cl. .................. 222/135; 222/144.5; 222/145.2; 222/145.3; 222/146.6; 222/148; 222/149
[58] Field of Search ................................ 222/1, 135, 131, 222/144.5, 146.6, 149, 145.1, 145.2, 145.3, 145.5, 129.3, 129.4, 148, 52, 63

[56] References Cited

U.S. PATENT DOCUMENTS

| | | | |
|---|---|---|---|
| 3,228,574 | 1/1966 | Patch | 222/559 |
| 3,330,129 | 7/1967 | Halverson et al. | 222/145.3 X |
| 5,410,888 | 5/1995 | Kaiser et al. | 62/136 |
| 5,464,120 | 11/1995 | Alpers et al. | 222/146.6 X |

FOREIGN PATENT DOCUMENTS 1175213  12/1969  United Kingdom ................ 222/145.3

*Primary Examiner*—Kevin P. Shaver
*Attorney, Agent, or Firm*—Harry M. Weiss; Jeffrey D. Moy; Harry M. Weiss & Associates, P.C.

[57] ABSTRACT

The present invention is directed to an improved frozen drink and dessert dispenser and method therefor. The improved frozen drink and dessert dispenser and method permits the simultaneous or alternate dispensing of two products. Further, through a dispensing valve system controlled by a controller, residue of dispensed product is purged from the product dispenser prior to the dispensing of the next serving of product and product may be dispensed in predetermined amounts. The improved frozen drink and desert dispenser and method also permits the automated cleaning of substantially all of the dispenser without any significant disassembly of the dispenser.

8 Claims, 10 Drawing Sheets

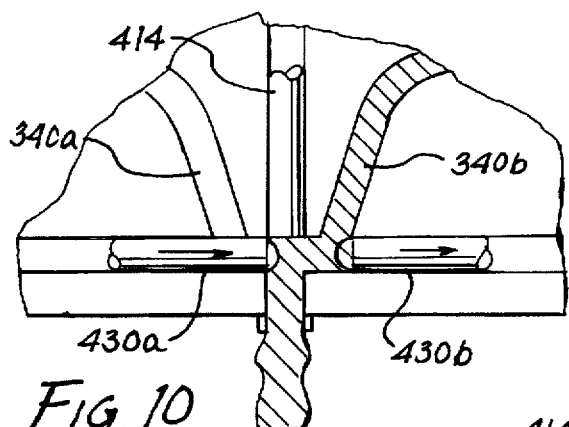
FIG. 10
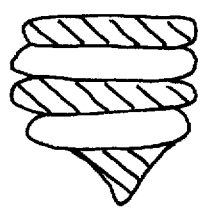
FIG. 11
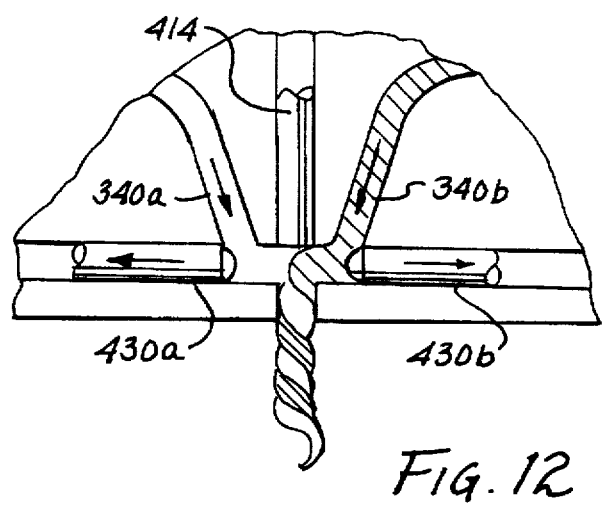
FIG. 12
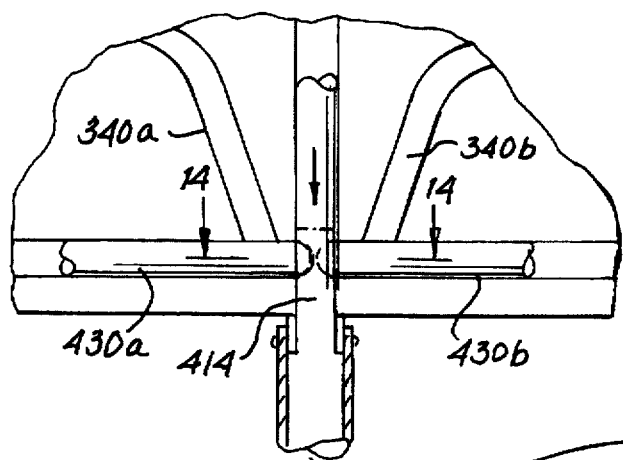
FIG. 13
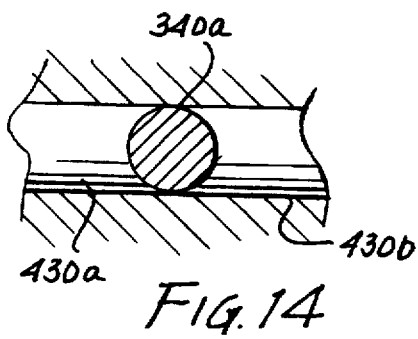
FIG. 14
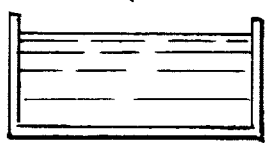

FROZEN DESSERT AND DRINK DISPENSER AND METHOD

FIELD OF THE INVENTION

The present invention relates to frozen dessert and drink dispensers and method for such products as frozen yogurt, soft ice cream, etc., and in particular, to a programmable, twin reservoir soft frozen dessert and drink dispenser and method.

BACKGROUND OF THE INVENTION

Frozen dessert dispensers are well-known. For example, prior art dispensers that dispense two flavors, either individually or mixed together in a "swirl" dessert are in common use. Such prior art dispensers are usually manually operated by the opening of valves in the dispenser to dispense the product and then closing the valves to halt the dispensing process. The amount of dessert dispensed is usually determined by a visual estimate that the correct amount of product has been dispensed. This method of dispensing product leads to a wide variation in the size of dispensed product, consequent consumer dissatisfaction at times, and wasted product. Sometimes, each desert is weighed to assure that the proper amount is dispensed. This is a time consuming and inconvenient procedure.

There are additional drawbacks with the prior art machines. While existing machines can dispense two flavors separately or in a swirl, existing machines cannot automatically layer two flavors during dispensing. Any such layering must be accomplished manually by alternatingly dispensing product from one dispenser and then the other. Additionally, with existing machines, a product residue remains in the valve ending in the dispensing nozzle, which residue may then adhere to the next serving of product. Often, it is necessary to discard product because it has been mixed with some of this residue.

Additionally, prior art dispensers are difficult to clean and maintain in a sanitary condition. Regulations of the Food and Drug Administration generally require that frozen dessert dispensers in commercial use be cleaned at least once a day. To thoroughly clean these devices it is often necessary to completely disassemble substantial portions of the dispenser prior to cleaning. This can be a time consuming operation and a labor intensive one as well, adding to the expense of having or operating such a dispenser. Most machines currently in use require as much as an hour or more to disassemble and reassemble. It would be desirable to have a self-cleaning soft serve dessert dispenser that could be cleaned and sanitized without disassembly thereof and that could dispense soft serve desserts in a new manner.

SUMMARY OF THE INVENTION

One important object of this invention is to provide a frozen dessert dispenser that dispenses or permits the dispensing of precisely predetermined amounts of frozen dessert having precisely predetermined physical characteristics of either of two different flavors or a combination of or alternate layers of such flavors, all from a single nozzle without unwanted mixing of the individual flavors of frozen dessert.

Another object of the invention is to provide a frozen dessert dispenser that is substantially self-cleaning and which can be cleaned and sanitized without requiring significant disassembly.

One of the important features of the invention resides in the dispensing valve system. The dispensing valve is controlled by a programmable logic controller. To operate the dispensing valve system, the operator first enters a signal into the controller by pushing a button on a display panel. The controller, responding to the input signal, gives a command to the valve assembly to initiate a specific action or a series of sequential actions depending on a particular stored program actuated by the input signal. The valve is capable of dispensing two flavors of frozen dessert to create four different types of servings. The programmable logic controller and valve system can also control the amount of the servings to dispense a predetermined amount of frozen dessert. The programmable logic controller also keeps a record of the amount of time that the dispensing valve is open, from which it can determine the amount of product being dispensed and the total amount of product that has been dispensed.

Another important feature of the invention is a cleaning operation, which is also controlled by the programmable logic controller. Cleaning the dispenser of the present invention requires substantially less time than is required to clean a dispenser in a prior art machine. For example, once the use of the machine has ended for the day, the operator or attendant pushes a button on the machine to place it into the clean cycle. There is a digital display system on the front of the machine that instructs the attendant to perform certain tasks to ready the machine for cleaning. The first task that the attendant is asked to perform is the purging of the ice cream product left in the machine. Once this has happened, the attendant then fills both reservoirs with water, connects the discharge hose to the valve, and is free to attend to other non-related duties. Within the reservoirs there is a heating element. Once the reservoir is full, the programmable logic controller turns on a heating element, heating the water in the reservoirs to a temperature of approximately 150 degrees, and also turns on the dasher that deliver the product to the nozzle. After the desired temperature is reached, the heaters are turned off. The programmable logic controller opens all pistons in the valve for a period of time sufficient to discharge the water in the chamber and then closes all of the pistons. This allows the heated water to flow into the chamber and the wash cycle continues a second time. At this point the heated water at 150 degrees is agitated in the chamber by the rotation of the dasher. The water heated to 150 degrees Fahrenheit is, according to manufacturers' specifications, more than sufficient to break down and totally dissolve any ice cream product and to kill any bacteria. (This temperature exceeds the ice cream manufactures' specifications of product break down at 136 degrees Fahrenheit.) This process flushes the smallest particles from any and all areas of the system. This action takes place for a period of time and the programmable logic controller opens all pistons and the hot water is discharged out. Then the pistons are closed allowing further hot water to enter the chamber to repeat this cycle a number of times. All of this action takes place unattended and no disassembly is required to completely clean the machine. Thereafter, the display instructs the attendant to flush the system with a sanitizer which, once again, is discharged by the machine. The final display instructs the attendant to flush the system with cold water, which is also discharged. The attendant now removes the discharge hose from the nozzle and cleans the reservoirs in place. At this time the machine is completely cleaned and is ready for the next day's use.

Another feature of the invention resides in the system that assures that the product is in proper condition and consistency to be dispensed. The control system monitors the power required to turn the dasher while blending the product in the freezing chambers. The consistency of the product being served is dependent on two elements—the temperature and viscosity of the product. The temperature of the product is measured by a thermistor device which is placed in the discharge side of the refrigeration system. The viscosity is measured by a load monitor that measures the current load of the motors driving the dasher. The programmable logic controller monitors both of these readings and activates the temperature control elements or motors where necessary to maintain optimal product quality. If desired, an EPROM controller system can be used in place of the programmable logic controller.

Other features will become apparent from the specification and drawings.

BRIEF DESCRIPTION OF THE DRAWINGS

FIGS. 10 through 12 inclusive depict generally in schematic fashion the dispensing operations in dispensing soft viscous food, e.g. frozen desserts, wherein:

FIG. 10 depicts the dispensing of frozen dessert from the B dispenser of the machine of this invention.

FIG. 11 depicts a layered frozen dessert dispensed by alternately dispensing the dessert from the A and B dispensers.

FIG. 12 depicts the dispensing of frozen dessert from both the A and B dispensers simultaneously, the frozen desert receptacle being turned during dispensing, as is traditional, to produce a "swirl" product.

FIG. 13 depicts the machine with a drain hose fitted to the nozzle for washing and sanitizing, with the gate or ram valves closed and the purge or dispensing gate closed.

FIG. 14 is a top view of the valving system as depicted in FIG. 13 showing the position of the purge or dispensing gate and gate or ram valves.

DESCRIPTION OF THE PREFERRED EMBODIMENT

Figure 1:
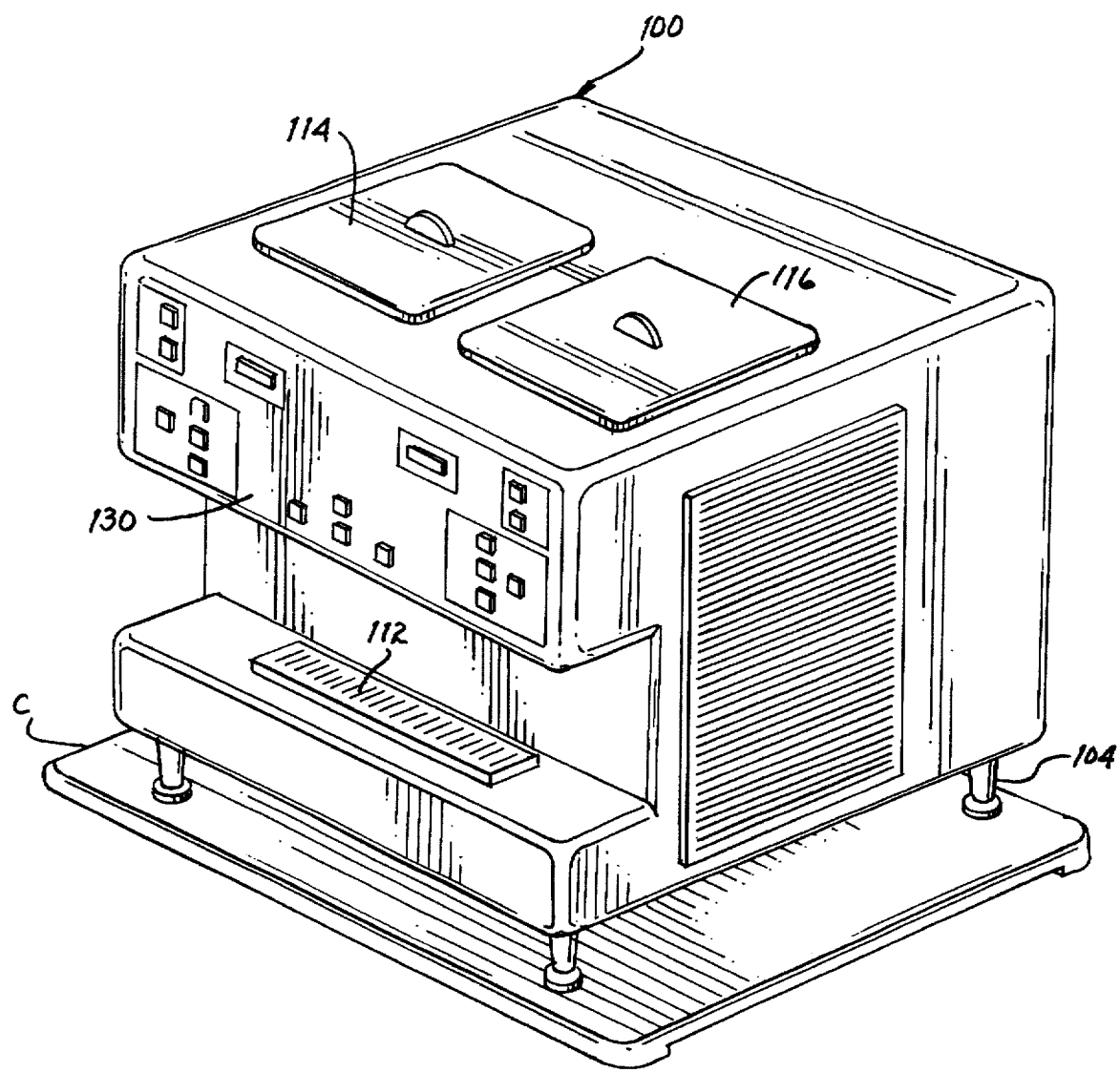
FIG. 1 is a perspective view of a convenient counter-top embodiment of a dispenser that embodies the features of the present invention.
Figure 2:
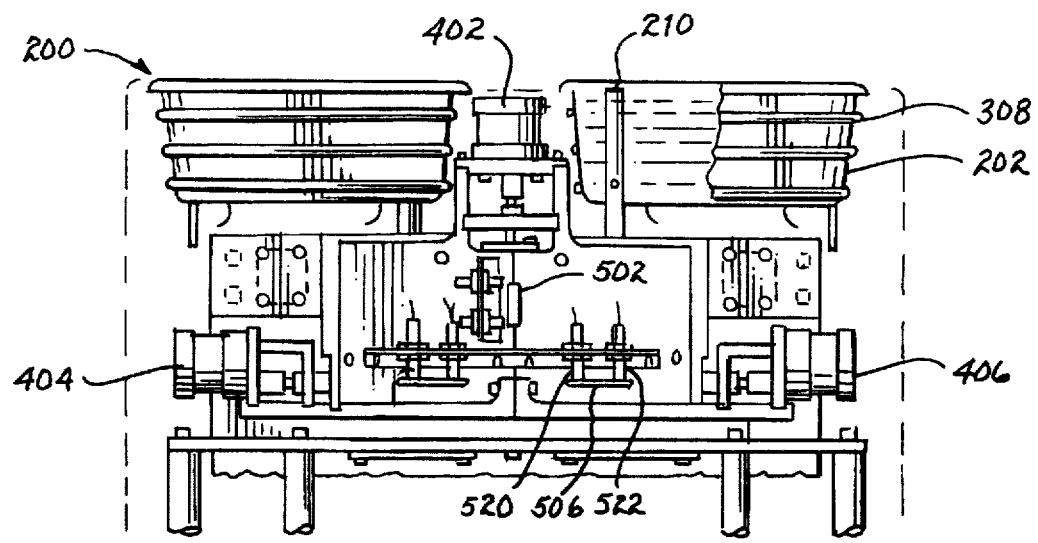
FIG. 2 is a front elevational view of the internal structure of the dispenser of FIG. 1.

The present invention is preferably embodied in a counter-top two-flavor frozen dessert dispenser of the type described in detail in the following discussion. The invention may, however, be embodied in any of countless outer configurations. For example, the invention may be configured without departing from its spirit or scope as a stand-alone dispenser wherein the dessert mix is pumped to the top of the mixing chamber by a peristaltic pump, gas pressure or otherwise.

In the preferred embodiment, described below, there are two identical reservoir systems and two identical mixing chambers that feed a single dispensing valve and control system. Viewed from the left and right, respectively, the two reservoir and mixing chamber combinations are mirror images of each other. In the interest of clarity, the detailed description of one of the combinations will not be repeated for the other.

The dispenser of the preferred embodiment of the invention will be described in terms of a housing and support assembly 100, a feed assembly 200, a mixing chamber assembly 300, a valving system 400 and a control system 500.

The Housing and Support Assembly

Figure 3:
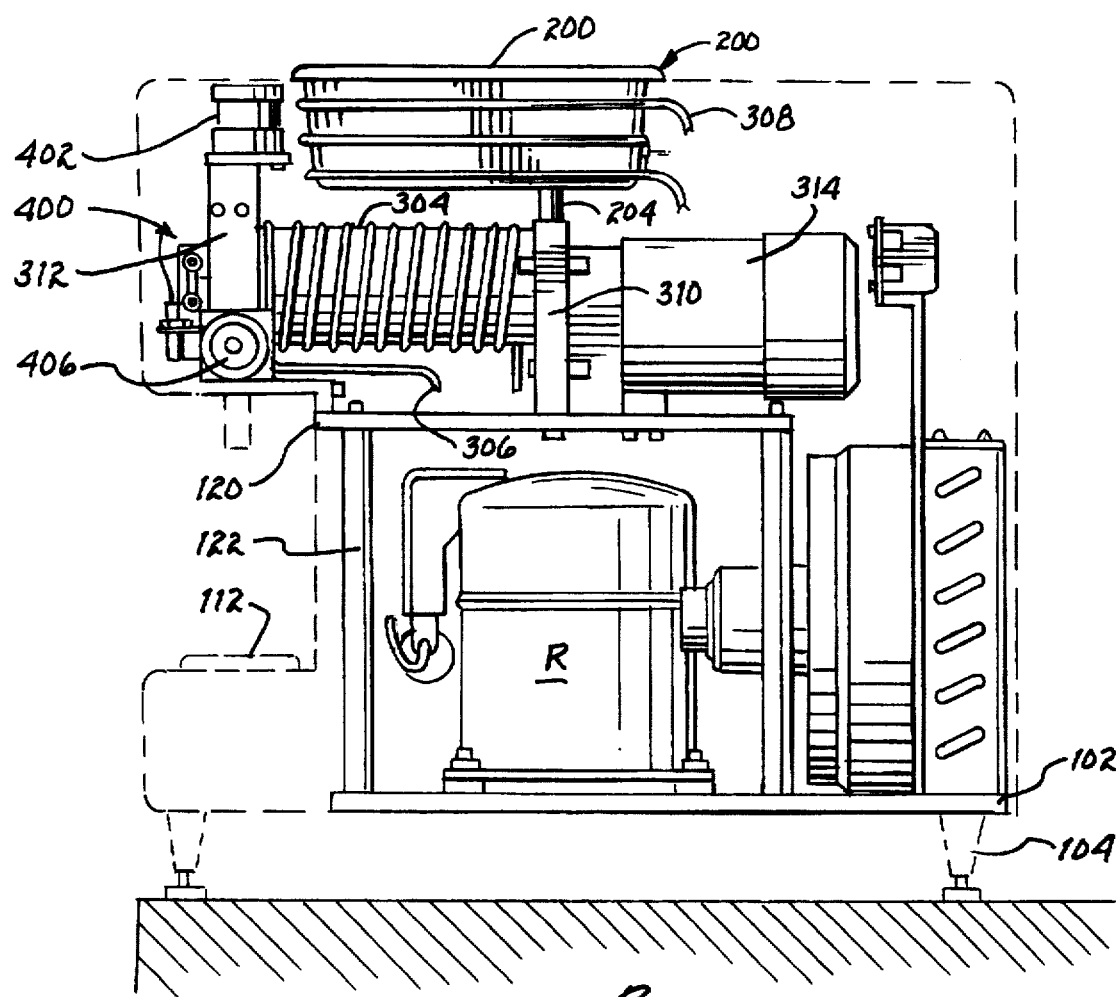
FIG. 3 is a side elevational view, taken from the right side as depicted in FIG. 2, of the internal structure of the dispenser of FIG. 1.
Figure 4:
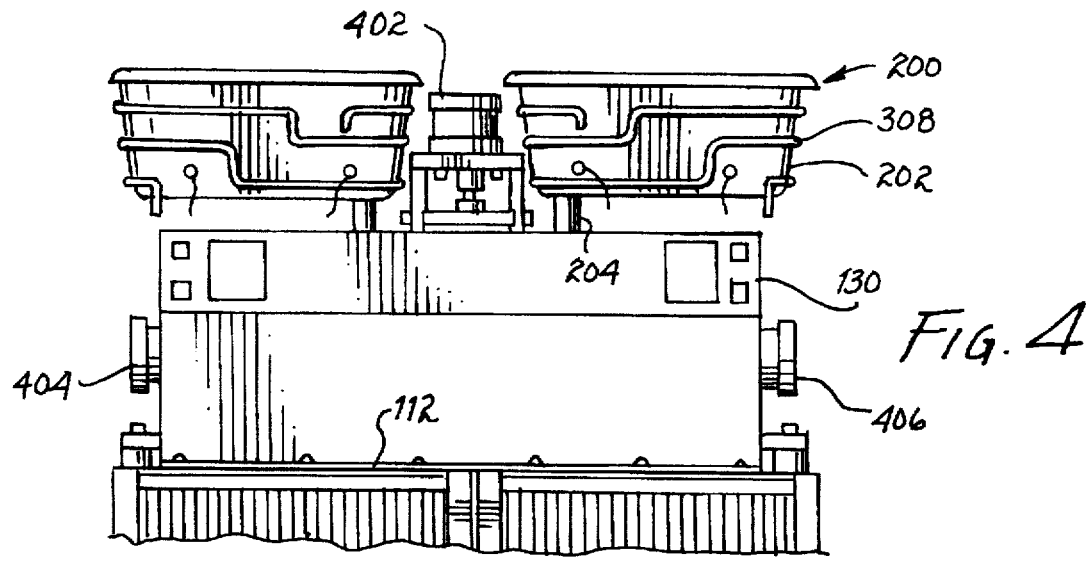
FIG. 4 is a partial elevational view of the rear of the dispenser of FIG. 1, showing a portion of the internal structure thereof.
Figure 5:
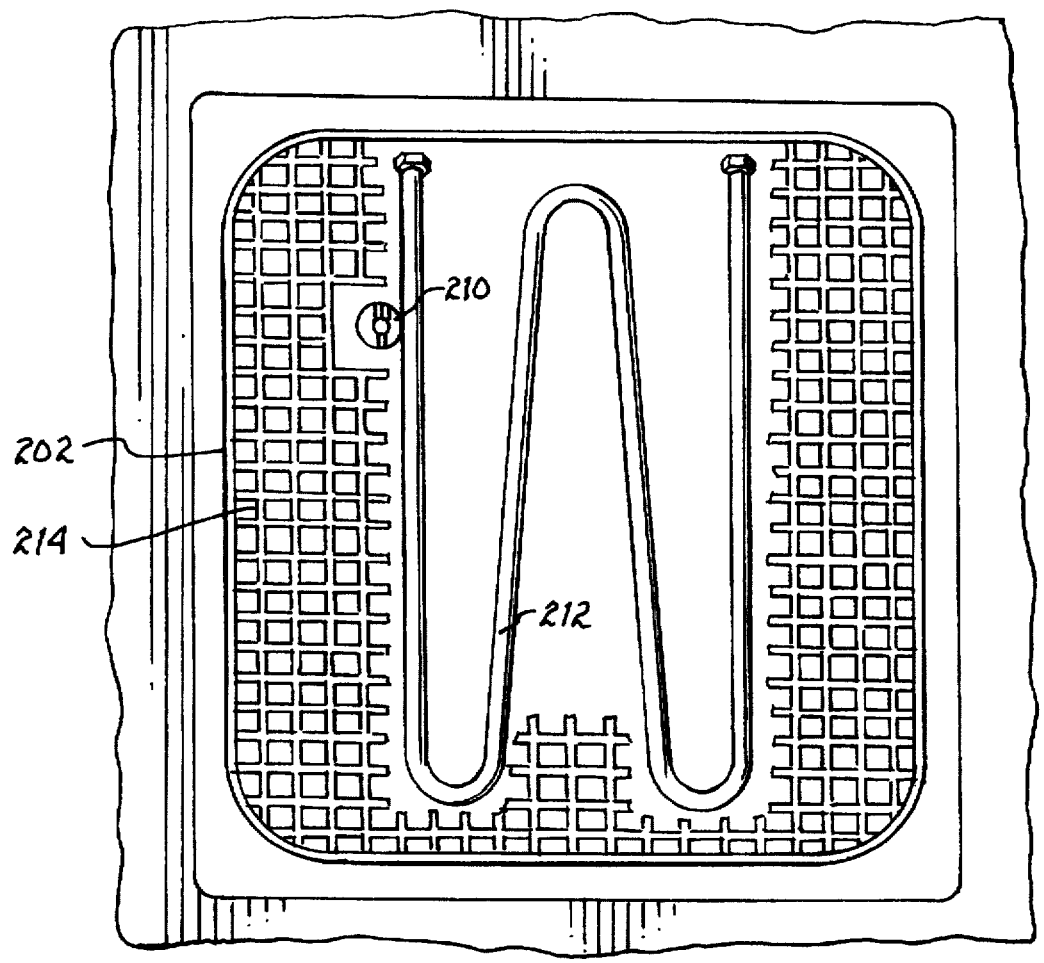
FIG. 5 is a partial view of one-half of the top of the dispenser depicting the reservoir and carburetor for the frozen dessert mix and the heating element for heating the cleaning solutions during the cleaning cycle.

Reference is made first primarily to FIGS. 1 and 3 with respect to which the housing and support assembly 100 will be described. The entire dispenser is carried on a base plate 102 which, in turn, is supported by adjustable length legs 104 for supporting the dispenser and leveling it on a counter. A housing 110 is mounted or supported on the base plate 102. The housing is so configured and constructed as to form a dessert receptacle shelf 112 which may be in the form of a grill and waste or overflow receptacle. Such support and overflow arrangements are so commonly used in the food service industries that no detailed description is deemed warranted. The housing also supports certain control panels, displays, etc., to be described hereinafter, and, in the top, is configured to define a pair of openings into which the dessert mix can be poured, and includes a pair of lids 114 and 116 for these openings. Ventilating grills and other openings and structures may also be provided.

A support plate 120, which is supported on a plurality of columnar supports 122 above a refrigeration system for supporting the mixing assembly and feed assembly (to be described below), is also provided.

The housing is configured and constructed to define a control console 130 having openings therethrough into which machine operating control buttons and status displays are mounted. These control buttons are described in connection with the control system described hereinafter.

The Feed Assembly

Reference is now made to FIGS. 2, 3, 4, 5 and 8, with respect to which the feed assembly 200 will be described. The function of the feed assembly is to provide a reservoir of dessert mix and to feed such dessert mix into the mixing chamber assembly as the mix in the mixing chamber is used up. A reservoir 202 is supported, in the preferred embodiment, above the mixing chamber by means of a downflow conduit system, and such other support structure as may be desired.

Figure 8:
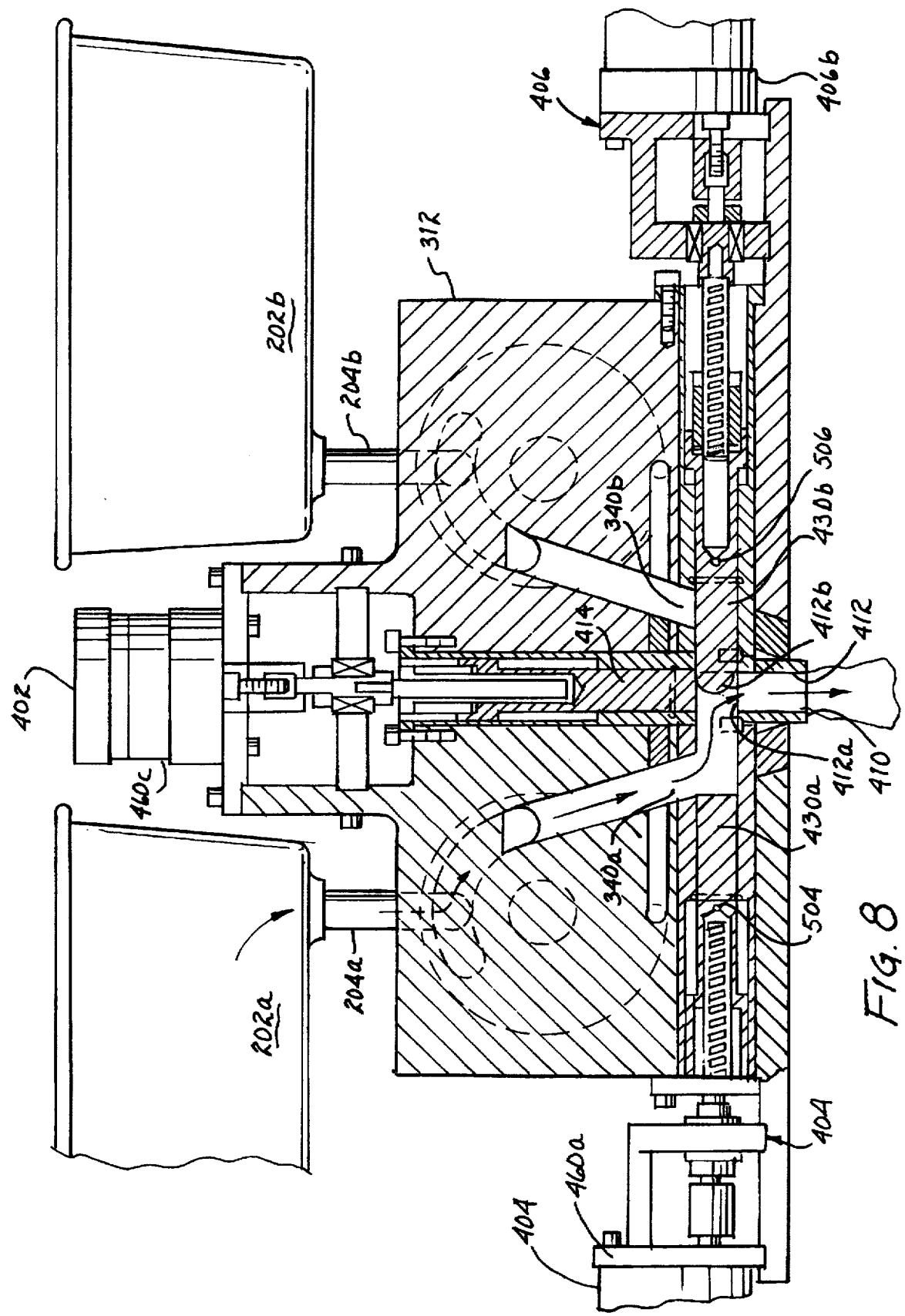
FIG. 8 is a front view of the machine, inside the housing, in partial cross-section showing the dispensing valve systems of the two dispensers, referred to as the A dispenser and the B dispenser, and the purge gate.

With particular reference to FIG. 8 now, the downflow conduit system comprises a downflow tube 204 into which a venturi-type carburetor plug 210 is fitted. A Teflon® (polytetrafluoroethylene) "O" ring seal 206 makes a fluid tight seal between the interior of the downflow tube. The carburetor plug 210 extends from a fluid tight seal with the downflow tube to a point proximate the top of the reservoir 202 and is formed to define an air conduit extending coaxially therethrough intersected by a lateral liquid conduit for the dessert mix proximate the bottom of the reservoir. As dessert mix flows by gravity into the downflow tube, air is drawn according to venturi's principle into the mix. The air is desirable to give the frozen dessert the desired texture. The ratio of air to liquid mix is a function of the relative sizes and configurations of the liquid and air conduits. A single carburetor plug can be provided or, if desired, carburetor plugs having various configurations can be provided thereby making it very simple to provide frozen desserts having various air to liquid ratios in the input to the mixing chambers.

The feed assembly is also used to provide water and sanitizing liquids for cleaning the dispenser. For this function, the reservoir is fitted with an electric heater 212. A grill 214 is positioned above the heater for safety. The grill may be removed for cleaning.

The Mixing Assembly

Figure 7:
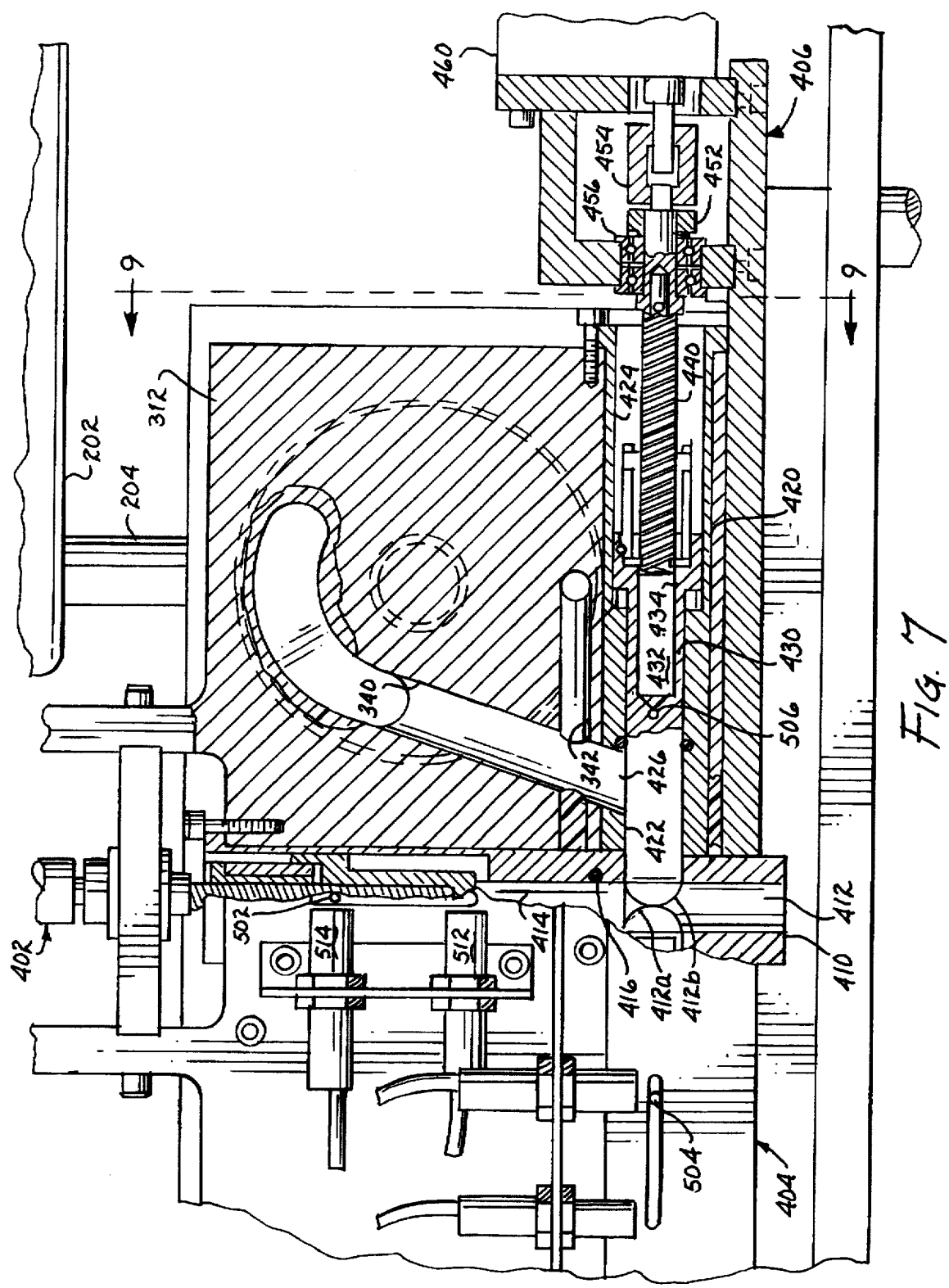
FIG. 7 is a partial elevational view, in partial cross-section, depicting the valve system for dispensing frozen dessert from one of the reservoirs, the other valve system being a mirror image of the system depicted in FIG. 7.
Figure 9:
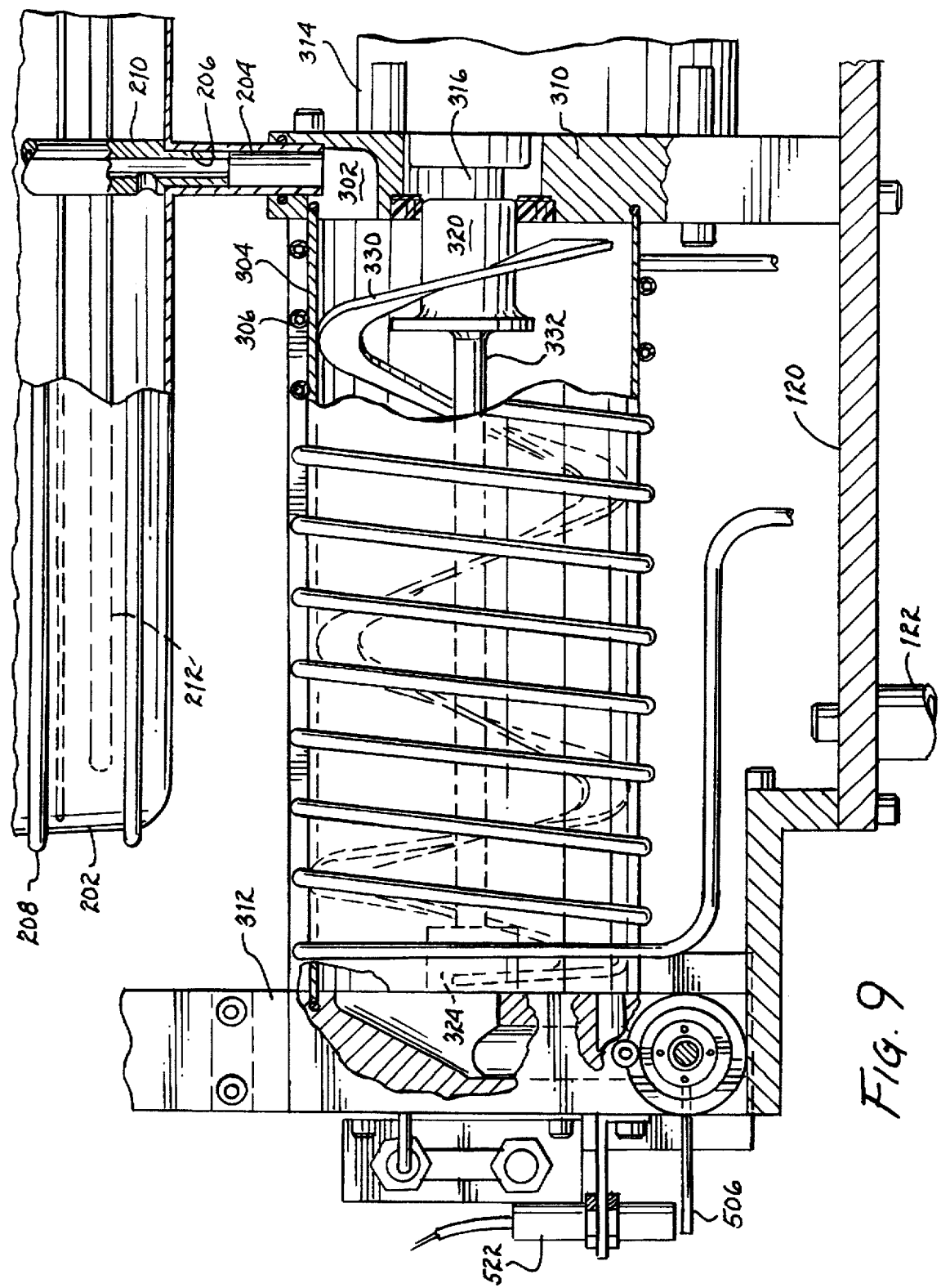
FIG. 9 is a partial elevational view of one of the freezing chambers, shown in partial cross-section, taken substantially along lines 9—9 in the direction of the arrows as shown in FIG. 7.
Figure 15:
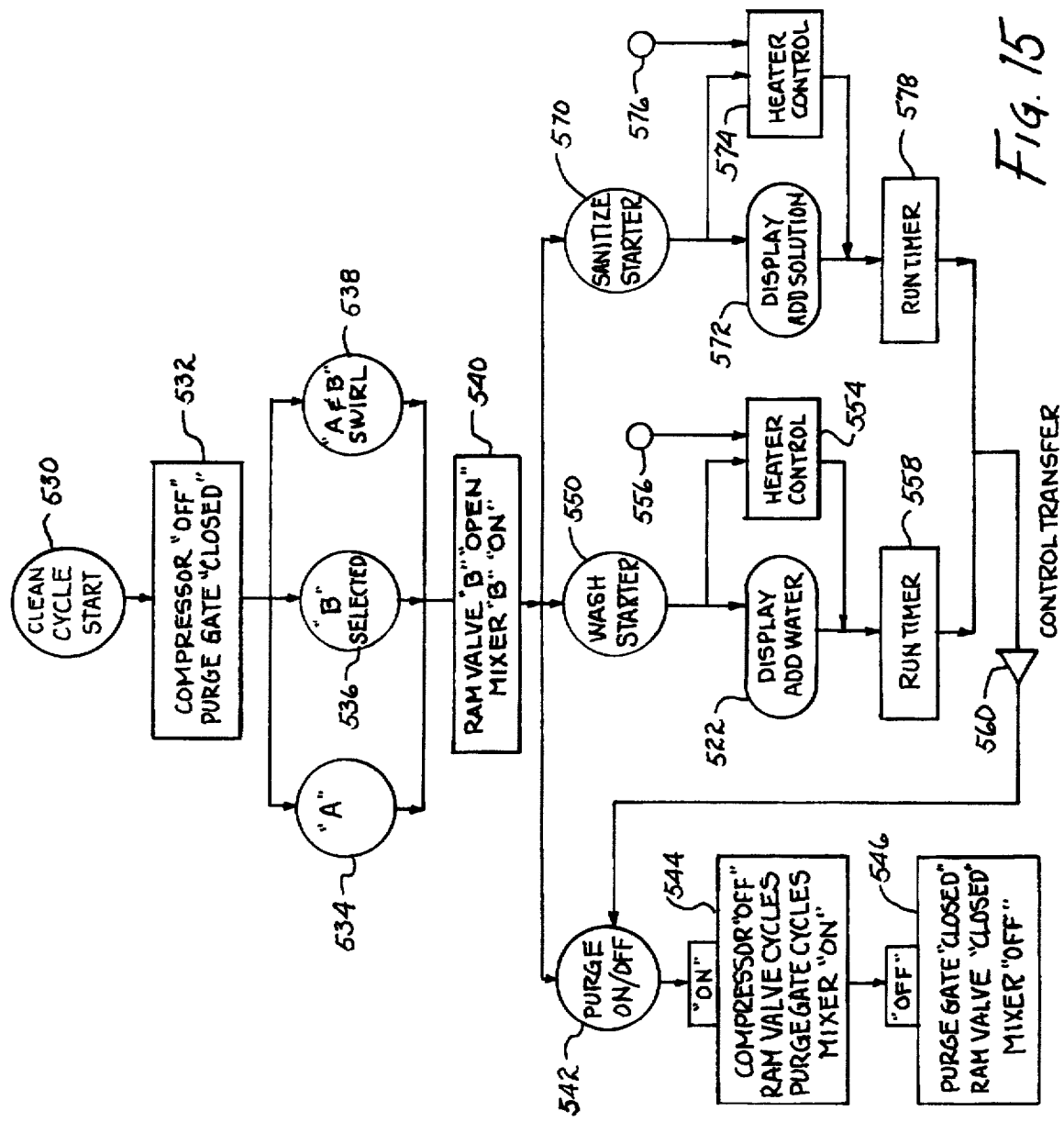
FIG. 15 is a flow diagram depicting the cleaning cycle control system.

Reference is now made to FIGS. 3, 7 and 9 with respect to which the mixing assembly will be described. With reference first to FIG. 3, the mixing assembly 300 comprises a horizontally disposed cylinder 304 that is wrapped, or otherwise in contact with, the cooling coils 306 of a refrigeration system indicated generally at R. The refrigeration system is designed to provide the necessary cooling capacity to chill the mix to the desired dispensing temperature, and is controlled in a particular manner as described hereinafter, but is a conventional compressor—radiator—expansion coil refrigeration system as to which a detailed description would be superfluous. The refrigeration system chills the reservoir by means of expansion coil 308 to a temperature above the freezing point of the dessert mix but cool enough to effectively prevent significant spoilage or degradation of the dessert mix by heat and to inhibit the propagation of bacteria in the mix. The reservoir may be spaced above the refrigeration coils a short distance, i.e., an inch or two, to achieve this cooling and/or a separate cooling coil for the reservoir may be provided.

With particular reference now to FIG. 8, the mixing cylinder 304 is support on plate 120 by means of a motor mounting bracket 310 at the rear feed input end and a valve mounting bracket 312 at the forward dispensing end. Insofar as the mixing cylinder is concerned, these two brackets are mirror images of each other having facing circular grooves into which the respective ends of the cylinder 304 are press-fitted, welded or otherwise secured in fluid-tight relationship. The motor mounting bracket supports a motor 314 that drives shaft 316 which extends through the motor mounting bracket and drivingly engages a first hub 320 at one end of a shaft 322 extending coaxially along the axis of the cylinder 304 and to which a mirror image hub 324 is fitted. The hub 320 is rotationally received in a fluid seal, such as a Teflon journal bearing, 326. The hub 324 is received in like manner in a seal in the valve mounting bracket, which seal is not shown in order to depict other structure more clearly. The two hubs 320 and 324 include brackets that mount, at the respective ends, an dasher flight 330, the hubs, shaft and flight being so constructed and configured as to define an dasher rotationally mounted coaxially with the cylinder with outer edge of the flight lying in close proximity to the interior surface of the cylinder 304. The dasher is driven by the motor 314.

Again with reference to FIG. 9 particularly, the downflow tube 204 of the feed assembly is received in a feed inlet conduit 302 that directs the dessert mix into the cylinder 304 for mixing and chilling to the proper consistency.

The Valving Assembly

Figure 6:
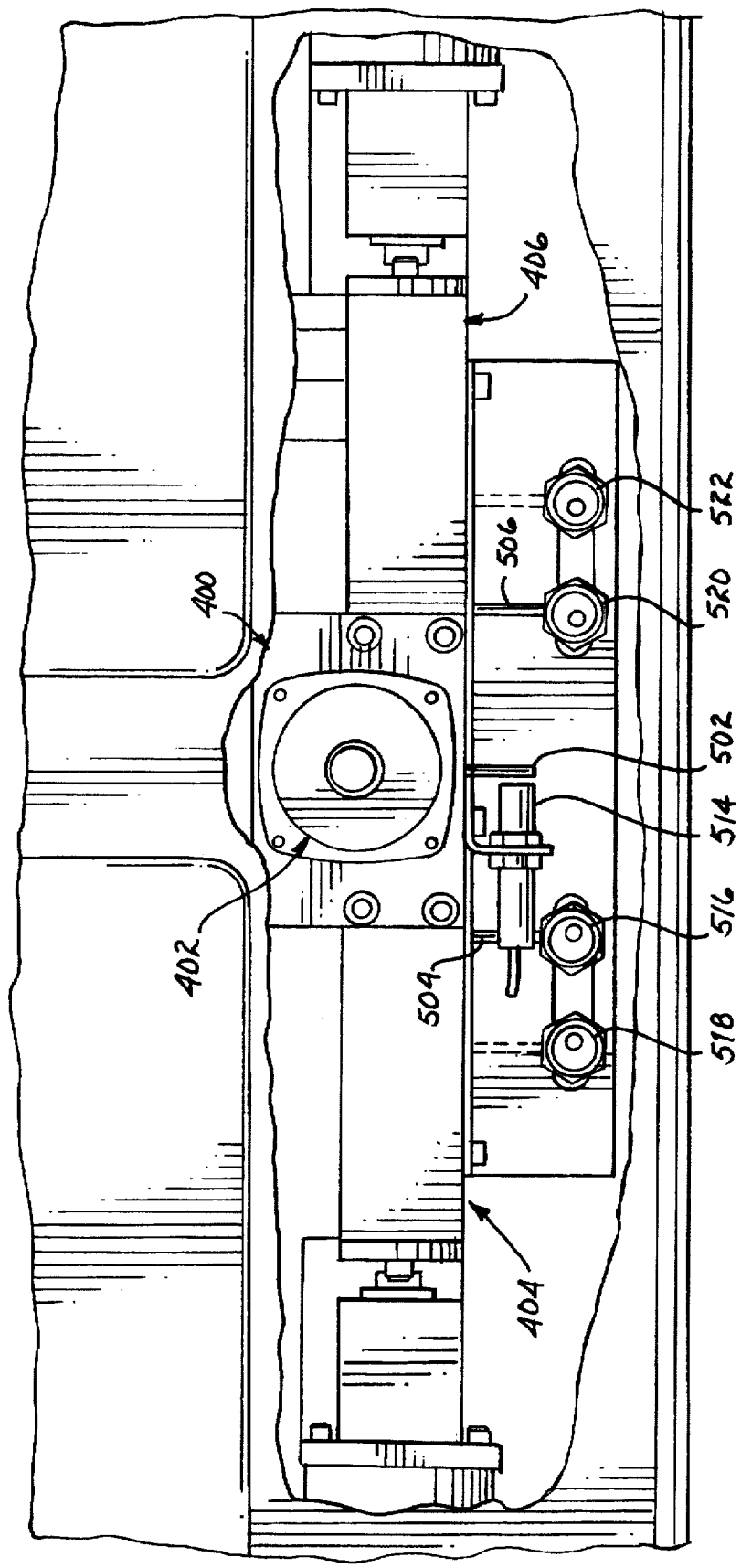
FIG. 6 is a partial top plan view of the dispenser depicting valving systems and position indicators for the valves used in dispensing frozen dessert.

Reference is now made to FIGS. 6, 7 and 9 with respect to which the valving assembly will be described. The valving assembly 400 comprises three piston-cylinder combinations, referred to hereinafter as rams, 402, 404 and 406, mounted by the valve mounting bracket 312 which, as described, also mounts the mixing cylinder. In the preferred embodiment, the valve mounting bracket mounts two such mixing cylinders side-by-side, each facing toward the valve mounting bracket and each constructed in the manner just described.

The three rams are mounted about the dispensing nozzle radially. The dispensing nozzle is the bottom end of the cylinder of ram 402 which is disposed vertically, the nozzle opening downwardly. A ram 404 is mounted to the left of the nozzle and another ram 406 is mounted to the right of the nozzle as viewed from the front of the dispenser. While it is not necessary that these rams be identical, it is economical to make them generally the same. Except for being mounted to the left and right, respectively, of the nozzle, rams 404 and 406 are identical, and they will thus be treated in this description. Accordingly, a detailed description of only one such ram, i.e., the piston and cylinder combination 406, is provided.

Reference is made briefly first to FIG. 6 which depicts the relative positions of the three rams. The driver of the vertically disposed ram 402 is shown in the center of the drawing. The two horizontally disposed rams 404, on the left, and 406, on the right, as shown in the drawing, are shown radiating from the bottom of the ram 402 that defines the nozzle.

Referring now to FIG. 7, it will be seen that the nozzle 410 is the bottom of a cylinder 412. The cylinder 412 slidably receives a piston 414. Particular note should be made of the location of the O-ring 416, proximate the bottom of the piston 414 when the piston is at its upper limit of travel as shown in FIG. 7. This location is important with respect to the self-cleaning feature of the dispenser, as discussed in detail below. The cylinder 412 is constructed to define two circular passages through the wall opposed to each other on the left side, passage 412a, and on the right side, passage 412b, proximate the lower end of the cylinder which, as stated, defines the nozzle 410, all as depicted in the drawing. The bottom end of the piston 414 is, preferably, flat or convex, although this is not a necessary feature. Except for the configuration of the piston (which need not be different) and the cylinder, which defines the nozzle and passages, the ram 402 is identical to the piston cylinder 406, which is described in detail below; accordingly, a detailed description thereof would be redundant and is, therefore, omitted.

With continued reference to FIG. 7, ram 406 comprises a cylinder 420 that defines a fluid passage 422, at the left, and a larger drive passage 424, at the right, as shown. Cylinder 406 is secured by welding or other sterilizable, fluid tight securement, to the cylinder 412 with the fluid passage 422 coaxial with and matingly aligned with the passage 412b, such that the passage 412b forms, in effect, an extension of the cylinder 406. The cylinder 420 is constructed to define a fluid inlet passage 426 through the wall thereof intersecting the fluid passage 422 for permitting inflow of frozen dessert from the mixing system. A piston 430 is slidably received in the cylinder 406, having a fluid valve portion 432 and a drive portion 434, the fluid valve portion fitting snugly into the fluid passage 422 for reciprocal sliding therein from a closed position, as shown in FIG. 7, wherein the fluid inflow passage is closed off, to the extreme left and extending into the passage 412b, to clear and effectively open the fluid inflow passage 426, to the open position, not shown, wherein the distal end 436 of the fluid valve portion 432 clears the fluid inflow passage and is proximate and just beyond, to the left as depicted, a Teflon O-ring 438 received in an annular groove in the wall of fluid passage 422. The relative position of the O-ring and the end of the piston, in the open position, is important with respect to the cleaning operation described below.

The proximal end of the piston 430 is hollow, extending into the fluid valve portion 432, to receive a drive screw 440 that is threadably received in a drive nut assembly 442 secured in the open adjacent the proximal end of the piston 430 in such a manner that the rotation of the drive screw 440 in one direction drives the piston toward the closed position, to the left as shown, and rotation of the drive screw 440 in the other direction drives the piston to the open position, to the right as shown. The screw 440a remains in the same location and the piston 430 reciprocates in the cylinder 420 between the open and closed position as the screw is driven by a drive motor assembly 450 that is coupled through suitable drive sleeves 452 and 454 and bearings 456 to the proximal end of the screw. The drive motor assembly comprises an electric motor 460 that rotates clockwise or counterclockwise in accordance with the manner in which an electromotive force is applied to the motor. Hydraulic or air motors may, of course, be used, but electric motors are usually more convenient to use.

The fluid inflow passage 426 is in fluid communication with a mixing cylinder outlet passage 340 defined in the valve mounting bracket 312. The mixing cylinder outlet passage 340 is cast, drilled or otherwise formed in the valves mounting block so as to extend from the top interior of the mixing cylinder 304 to the fluid passage 422 in cylinder 420 to define a fluid flow path from the interior of the mixing cylinder 304 through the fluid passage 422 to the nozzle 410 when the ram 406 is in the open position and to close such fluid flow path when the ram is in the closed position, the closed position being shown in FIG. 7. A cleaning fluid passage 342 is also formed, in like manner as desired, from the bottom of the mixing cylinder 304 to intersect the outlet passage 340 to permit complete drainage of the mixing cylinder during the self-cleaning operation.

The ram 404 is identical in function and operating structure, operating the same as described with respect to ram 406 except that the fluid passage of the cylinder is mounted to communicate with the passage 412a in the nozzle cylinder 412a on the left side, as depicted.

Both of the rams 404 and 406 function principally as valves, even though the fluid passages therein are emptied upon the closure of the valve by the displacement of the piston in the fluid passage.

The ram 402 operates in the same manner, with the exceptions now described. The piston cylinder 402 comprises a nozzle cylinder 412 previously described that comprises a fluid passage terminating at the bottom with the nozzle 410. The piston 414 moves reciprocally, being driven in the manner described with respect to ram 406. The piston 414 is shown in the open position in FIG. 7, at its maxim proximal travel, upwardly as depicted, in which position frozen desert can enter the cylinder 412 and exit the nozzle 410 from either or both of the fluid flow passages in the ram valves 404 and/or 406, depending on whether the respective valves are open. When the piston 414 is in the maximum distal position, fully down as depicted, the piston will block flow from either of the ram valves 404 or 406 and, to this extent, also performs as a valve. The principal function of the piston 414 is not as a valve but, rather, as a clearance or purge ram to displace all of the frozen desert in the cylinder 412 above the nozzle 410.

The rams are preferably manufactured as separate sub-assemblies and then secured radially together and to the valve mounting bock in the manner described using such fastening methods as are most convenient in the manufacturing facility. Various fasteners, e.g., machine screws, bolts, welds, etc., are depicted in the drawing without specific identification or description because fastening methods are not, Per se, part of the invention and such descriptions would be tedious without being useful. It is possible, also, to form the cylinders in one block that also forms the valve mounting block. Other manufacturing methods and techniques may also be used.

The components that come into contact with the frozen dessert and washing solutions are, in the present preferred embodiment, made of stainless steel and such is likely generally to be the material of preference. Other materials may also be used, however. Any metal or plastic (polymeric) material that is suitably strong and dimensionally stable and which are approved for contact with foods and cleaning solutions may be used.

Mechanical Operation

A manually controlled dispenser as described would be perfectly functional, albeit somewhat less convenient than the automated embodiment of the invention as more fully described hereinafter. It is, accordingly, appropriate to pause here and describe the mechanical operation of the system.

Referring to FIGS. 6, 7, 8 and 9, and making particular reference to FIGS. 10 through 14, the mechanical operation is now described.

The operator would, at the beginning of the business day, pour a suitable volume of liquid frozen dessert mix into the reservoir 202. The mix would flow through the carburetor plug 210 where air would be entrained therein and into the mixing cylinder 304 where it would be chilled to below its freezing point by the refrigeration coils while being mixed by the dasher, the resulting product being a soft but essentially solid frozen dessert having entrained air generally referred to as frozen yogurt or soft ice cream, depending on the kind of mix used. The frozen desert from either or both of the respective mixing cylinders can be permitted to flow by gravity and the force generated by the dasher through the ram valves 404 and 406 into the cylinder 312 and out the nozzle 310 and into the cone or dessert dish the operator has placed under the nozzle, as depicted in FIG. 10. The frozen desert may be either of the two flavors available, one from each of the mixing cylinders, alternate layers of frozen desert, as depicted in FIG. 11, produced simply by opening one and then the other of the ram valves 404 and 406, or a ribbon of each flavor, which may be a swirl, as depicted in FIG. 12, if the receptacle is turned during dispensing. Upon completing the dispensing of a service unit of the frozen desert, the operator actuates the purge ram to the "purge" position, full down as depicted in the drawings, in which position the bottom of the piston 314 generally coincides with the bottom of the cylinder 312, i.e. the nozzle 310, thus clearing the dispenser nozzle of any product. The obviates the necessity for purging the nozzle before dispensing a different flavor. The purge ram 402 can also be actuated alternately with the valve rams 404 and 406 to dispense well-defined discrete layers of the two flavors of frozen dessert available from the dispenser.

It will be apparent that three or four, or even more, flavors could be dispensed from a single machine simply by adding mixing chambers and valve rams feeding into the nozzle. Generally, however, two flavors meet the commercial demands placed on the restaurant or other business using the machine.

As depicted in FIGS. 13 and 14, the dispenser is substantially self-cleaning, without the need of disassembly. At the close of business each day, or at a predetermined time each day in the case of a 24 hour business, the refrigeration is turned off and any frozen mix is allowed to thaw. The mix is drained from the dispenser and the reservoirs are filled with water. Hot water may be used, but cold water can also be used because a heater is provided in the reservoir to assure that the flush water is maintained at a temperature of at least 150° F. According to industry standards, all food-contacting surfaces must reach a temperature of at least 136° F. to dissolve the mix and pasteurize any minute traces of mix that might remain on the surface. The temperatures to be reached can, of course, be adjusted to meet applicable health and regulatory criteria. The hot water from the reservoir flows through the entire system while the rams are operated repetitively until all food contacting surfaces have been thoroughly washed. The wash operation may, of course, be repeated as many times as desired. Following the initial wash operation, which may use plain hot water or detergent containing water, the reservoir is filled with a sanitizing solution. Such solutions usually contain a peroxide or hypochlorite biocide that sanitizes whatever surface it contacts, killing all bacteria and other pathogenic microbes, and may contain detergents as well. The sanitizing solution is caused to flow through the entire system at such temperature and for such times, while the rams are repetitively actuated to and fro from closed to open positions, etc., as may be necessary to assure that all microbes in the system have been killed. Following the sanitizing cycle, a similar rinse cycle is initiated using clean water to remove all traces of sanitizing solution. The system is drained and may be dried by an air stream if desired, and is ready to be filled with dessert mix and used again.

It will be appreciated, now, that the positioning of Teflon O-rings in the respective cylinders adjacent the distal end thereof is an important facet of the invention. This arrangement makes it possible to assure that all food contacting surfaces are cleaned and that food is not permitted to flow to areas not reached by the cleaning.

Actuation of the rams can be accomplished by toggle switches, for example, that apply the proper EMF to cause the drive motors of the ram assemblies to rotate, selectively, clockwise or counter clockwise, using clutch mechanisms or limit switches to prevent over driving the rams. All this is, of course, the most elementary electrical technology well within the skill of the art. Likewise the dasher can be turned on and off by the operator. Thus, as a mechanical system, the dispenser can be operated entirely manually. Such is not contemplated, however, within the preferred embodiment.

The Control System

The control system assures that the product is of the proper texture, i.e., that it is frozen to the desired temperature and that it is of a desired, predetermined thickness or viscosity. The control system in the preferred embodiment largely automates the dispensing of frozen dessert and the cleaning and sanitizing of the machine daily or periodically as necessary to assure that the frozen dessert is free of bacteria that may have propagated in situ or picked up from machine surfaces.

A basic set of components of the control system are three sets of switches that sense the open and closed position of the purge gate and the two ram valves and send either an "OPEN" or a "CLOSED" signal to other components of the control system and, if desired to displays operated by the control system.

These switches are described with particular reference to FIGS. 6,7, 8 and 9. Particular reference is made to FIG. 6 which is a partial top view of the machine, with the cover removed, depicting the exterior of the valves that control the flow of the frozen dessert.

To review, briefly, there are three valve assemblies identified as 402, 404 and 406.

Valve assembly 402 is referred to as a purge ram, because it is a piston-cylinder ram that forces frozen desert from the nozzle after each serving of dessert is dispensed. It is also properly described as a purge gate because it performs the purge as described and is also the ultimate gating valve that permits or precludes the dispensing of frozen desert. In order to more easily describe the system and identify the valve system 402, this system will be referred to as the "purge gate" in the following discussion. The purge gate is vertically disposed with the operating components on the top, the bottom defining the nozzle 410.

Radiating from the left, as viewed in FIG. 6, is the ram valve 404 and radiating from the right, as so viewed, is the ram valve 406. These ram valves open and close frozen dessert flow paths from, respectively, the left mixer and from the right mixer. For convenience in describing the dispenser and its operation the two mixers, along with their associated valving, supply, etc., structures, are referred to as the "A" dispenser, on the left, as viewed in FIGS. 6 and 9, and the "B" dispenser on the right, as so viewed. The individual components of these two dispensers are either identical to each other or mirror images of each other and operate in the manner previously described.

Again making particular reference to FIGS. 6 and 7, the control system comprises a position indicator in the form of pin 502 that is fixed to the piston 414 or associated structure and moves therewith or is otherwise caused to move between an OPEN position and a CLOSED position corresponding to the OPEN and CLOSED position of the purge gate. The CLOSED position of the pin is sensed by a proximity switch 512, shown in FIG. 7, and is sensed in the OPEN position by a proximity switch 514, shown in FIG. 6. Position indicator 502 is described as a pin, as that is its configuration in the presently preferred embodiment, but virtually any configuration may be used. The proximity switches 512 and 514 may be two separate switches, as is the case in the preferred embodiment, or a two position switch that is switched from one position to the other according to the location of the position indicator. The proximity switches may be magnetically actuated, photoelectrically actuated, induction field actuated, or mechanically actuated so long as the position of the position indicator actuates the switch or switches to an OPEN position and to a CLOSED position corresponding to the OPEN and CLOSED position of the purge gate.

Referring again to FIG. 6, another position indicator, pin 504, is likewise associated with ram valve 404. Likewise, a position indicator, pin 506, is likewise associated with ram valve 406. The position indicator 504 moves from a position corresponding to the CLOSED position of ram valve 404 reciprocally to the OPEN position of said ram valve 404. The CLOSED and OPEN positions of the ram valve are sensed by proximity switches 516 and 518 respectively, and signals indicating the respective positions of the ram valve 404 are sent to the control system. In like manner, the position indicator 506 moves from a position corresponding to the CLOSED position of ram valve 404 reciprocally to the OPEN position of said ram valve 406. The CLOSED and OPEN positions of the ram valve are sensed by proximity switches 520 and 522 respectively, and signals indicating the respective positions of the ram valve 406 are sent to the control system.

Referring now primarily to FIG. 10, the self-cleaning cycle of the control system will be described. Either the "A" dispenser of the machine or the "B" dispenser of the machine, or both, may be selected to be cleaned; however, normally all of the food contacting surfaces of the machine will be cleaned at once. The cleaning cycle is initiated by pressing the "CLEAN" button, indicated at 530 in FIG. 10, which, as indicated at 532, turns the compressor off to permit the mixing cylinder to warm and the purge gate is closed. The operator then presses one of the three dispenser selector buttons, 534,536 and 538, to select, respectively, the A dispenser, the B dispenser or both the A and B dispensers to be cleaned. As indicated at 536, in the example described, the B dispenser is selected to be cleaned. This selection opens the B ram valve and turns the B mixer on, as indicated at 540. The operator then selects whether to purge, wash or sanitize the B dispenser.

Normally, the first step is to purge the B dispenser. Purging is begun by pressing the Purge button 542 which, as indicated at 544, turns the compressor off and the mixer on, cycles the selected ram valve, ram valve B, and the purge gate repetitively, such that the purge gate is always open when the ram valve closes. In this example, the compressor will be off, the mixer on and the ram valve open already. These functions are performed by the purge control when it is desired to purge the dispenser without cleaning it, e.g., to start a new batch of dessert mix, etc. When the purge is complete, the purge button 542 is pushed again and, being a toggle switch, turns the mixer off and closes the ram valve and the purge gate, as indicated at 546, thereby ending the purge cycle.

The usual second step is to wash the dispenser. Washing is started by pressing the WASH button 550 which causes the message ADD WATER to the display 552 and causes the heater control 554 to turn on the heater in the reservoir. A temperature sensing element 556 senses the temperature of the reservoir contents and keeps the heater on until the reservoir contents reach the desired temperature, at least 150° F. typically. After the operator has added water and the water has reached the desired temperature, the run timer 558 causes mixer to continue running for a suitable period of time, 7 minutes in the example. After the designated time period, the timer stops and sends a signal through the control transfer gate 560 to the purge ON/OFF controller, which starts the purge cycle as described above, with the exception that in this cycle it is the hot wash water that is being purged and, in the course thereof, washing the food contacting surfaces of dispenser B. In a preferred embodiment, starting the WASH cycles causes the B ram valve actuator and the purge gate to cycle repetitively during the purge cycle to thereby thoroughly wash the portions of the pistons of these units that contact the dessert flow passages of the machine. As described, the selected ram valve, ram valve B, and the purge gate are cycled between the OPEN and CLOSED positions repetitively, such that the purge gate is always open when the ram valve closes.

The usual third step is to sanitize the dispenser by pressing the SANITIZE button 570, which causes the display 572 to show a suitable message such as "ADD SOLUTION." In addition, the heater may be turned on by the heater control 574, and reservoir temperature sensor 576, which may be the same as heater control 554 and sensor 556, identical thereto or different, and may include a reservoir which turns on the heater and maintains the heat input until the sanitizing solution reaches the desired temperature. Some sanitizing solutions are as effective at room temperature as they are at higher temperatures, in which case no heating may be required. The run timer 578 maintains the contact of the sanitizing solution for the desired period of time, about 5 minutes typically, after which it transfers control through the control transfer gate 560 to the purge control system which performs as described respecting the wash cycle.

The wash cycle is then repeated using fresh water to flush out all of the sanitizing solution, after which the dispenser is clean and ready to be used again.

The same purge, wash and sanitize cycles are performed on the A dispenser and may be performed on both the A and B dispensers at the same time by pressing, respectively the A button or the A&B button.

The control system as described is preferably an EPROM with suitable firmware or a software controlled digital processor, and control circuits and components, but the control and timing functions can be performed by an electromechanical timer switch generally of the type used on washing machines, clothes dryers, dishwashers, etc. which cause the controlled device to cycle through a set of predetermined operations. In either instance, the process is stopped, if necessary, when it is necessary to add water or solution and is resumed when water or solution is added and the water or solution is at the desired temperature.

Upon re-examination of the structure of the purge gate and the ram valves, making particular reference to FIGS. 7, 8 and 9, and the relationship of the O-ring seals described earlier, it will be clear to those skilled in the art that the cleaning cycle as described will wash and sanitize all of the food handling surfaces of the dispensing machine of this invention, without need to disassemble the same.

Reference is now made particularly to FIG. 11 with respect to which the run and standby cycles of operation in the dispensing of soft ice cream, frozen yogurt or other frozen food.

Upon starting the machine into operation, the STANDBY button 602 is pressed, sending a start signal to the product condition control monitor 604 and the bypass timer 606. Each time a signal is received, the bypass timer turns the compressor and the mixer on, as indicated at 608, to assure that the product is remixed and frozen. The product condition monitor 604 receives a temperature input signal from a temperature sensor 610 which senses the temperature of the contents of the mixing drum, directly by way of a thermocouple or thermistor in thermal communication with the output end of the coil that surrounds the mixing chamber. The product condition monitor 604 also receives a signal from a load sensor 612. The load sensor 612 produces a signal proportional to the force required to rotate the dasher which is a measure of the thickness or viscosity of the product in the mixer. Such a signal may be obtained by measuring the current input into the motor 314, a strain gauge on the dasher drive, or any of many other ways. The physical characteristics of the product are defined by the temperature and viscosity of the product, hence, by assuring that the temperature and viscosity fall within a predetermined range, product texture quality of the product can be assured. The product condition monitor maintains the compressor ON and the mixer ON until the proper physical characteristics are obtained.

When the product condition monitor turns the compress and mixer off, the Standby Select button 614 and Run Select button 616 are again in the circuit. The standby operation can run for a predetermined time controlled by timer 618 or the machine can be placed in the run condition wherein the standby cycle just described is repeated periodically as controlled by timer 620.

Figure 16:
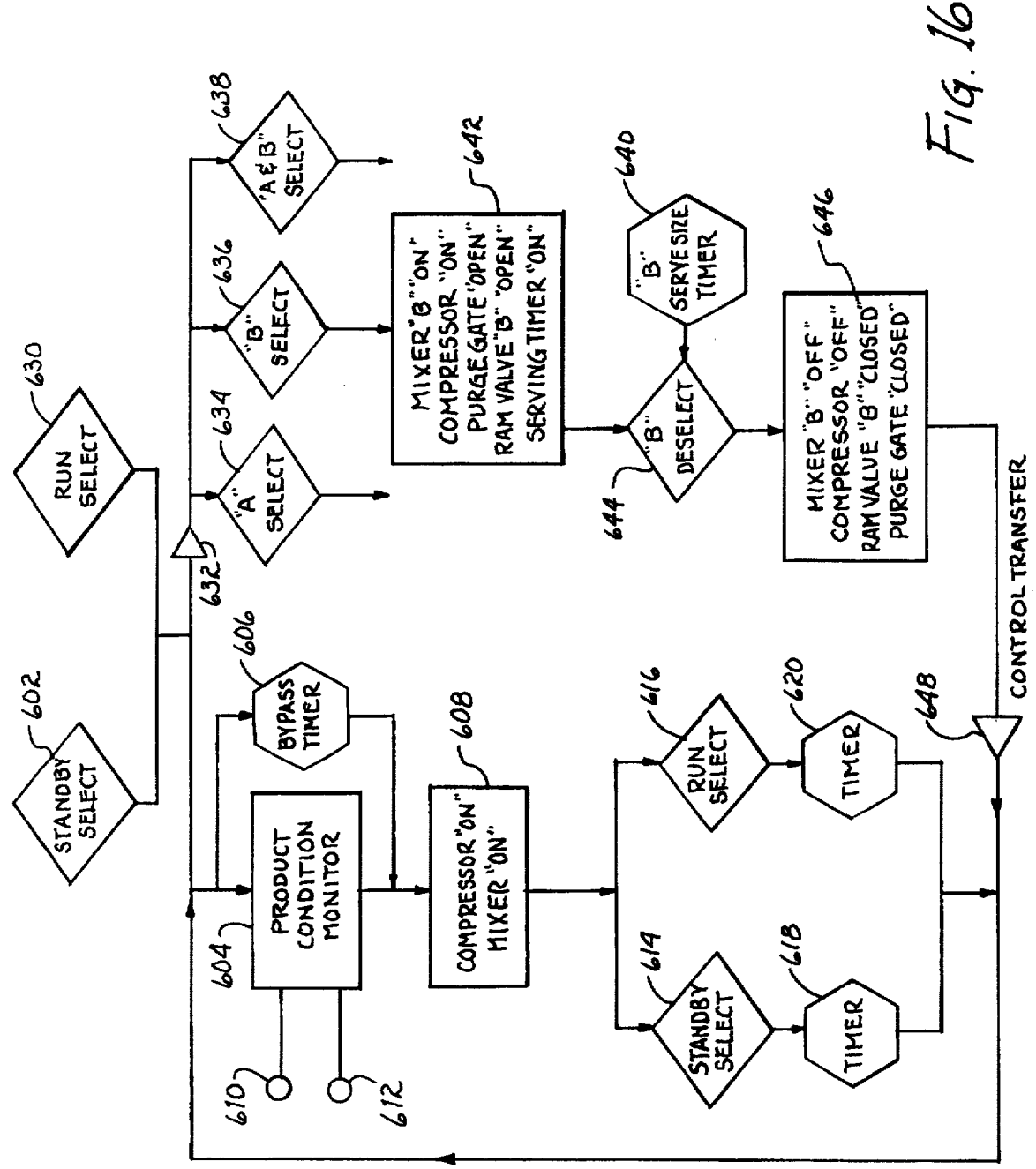
FIG. 16 is a flow diagram depicting the standby and run cycle control system.

When the operator is ready to dispense desert, the operator press the run select button 630 which automatically causes the compressor and mixer to be turned on for a period of 30 seconds by the by pass timer 606 and, through the control transfer gate 632 activates the A, B, and A&B select switches 634, 636 and 638, to dispense from either or both of the dispensers, as selected. In the example of FIG. 16, the B dispenser is selected by way of button 636. A serve size timer set 640 may also be set by or at the same time as the dispenser is selected. As indicated at 642, the B mixer and the B ram valve are opened and the compressor, purge gate and, if provided, the B serving size timer are turned on, causing the dasher to turn and force the frozen dessert through the ram valve and purge gate into the receptacle positioned under the nozzle by the operator. Either manually when the desired amount of dessert has been dispensed, or by way of the serving size timer, the B deselect control 644 is actuated closing the ram valve, forcing all of the desert out of the cylinder thereof, closing the purge gate, forcing the dessert out to the purge gate and nozzle, and also transferring control through control transfer gate 648 to the product condition monitor and by pass timer which mix and refrigerate the dessert mix that flows into the mixing cylinder to replace the amount dispensed.

The same steps are followed in dispensing from dispenser A and, by operation both dispensers, from both A&B.

It will be appreciated that the foregoing disclosure is of an exemplary embodiment and that many variations, especially as regards the control system, may be made without departing from the invention; indeed, as pointed out, the dispensing can be carried out by manual mechanical operations. The term frozen dessert as used in the following claims is intended to cover all forms of frozen desserts such as ice cream and yogurt and all forms of frozen drinks. The term ram as used herein and in the following claims is intended to mean ram or piston.

Industrial Application

This invention is useful in food service industries.

What is claimed is:

1. A machine for dispensing two kinds of frozen food. comprising
a first dispenser for one kind of frozen food, said first dispenser comprising:
a reservoir for receiving liquid mix to be frozen;
a mixing container comprising refrigeration means and mixing means for receiving and freezing said liquid mix to form a viscous frozen food product;
a first cylinder and piston ram valve assembly, said first assembly comprising:

a first cylinder having proximal and distal ends said first cylinder being in fluid communication with the mixing container for receiving food therefrom; and
a first piston having proximal and distal ends reciprocally movable in the first cylinder from an open position wherein frozen food flows through into the first cylinder and out the distal end thereof to be dispensed and a closed position wherein the first piston prevents food from flowing into the first cylinder and substantially fully occupies the first cylinder for thereby forcing substantially all of the food out of the first cylinder;
a second dispenser for another kind of frozen food, said second dispenser comprising:
a reservoir for receiving liquid mix to be frozen;
a second mixing container comprising refrigeration means and mixing means for receiving and freezing said liquid mix to form a viscous frozen food product;
a second cylinder and piston ram valve assembly, said second assembly comprising:
a second cylinder having proximal and distal ends, said second cylinder being in fluid communication with the second mixing container for receiving food therefrom; and
a second piston having proximal and distal ends reciprocally movable in the second cylinder from an open position wherein frozen food flows through into the second cylinder and out the distal end thereof to be dispensed and a closed Position wherein the second piston Prevents food from flowing into the second cylinder and substantially fully occupies the second cylinder for thereby forcing substantially all of the food out of the second cylinder; and
a third piston and cylinder ram valve assembly comprising:
a third cylinder having a proximal end and a distal end, the distal end defining a product dispensing nozzle, said third cylinder being so constructed as to define first and second passages through the wall thereof, and wherein each said first and second cylinder of said first and second cylinder and piston ram valve assemblies is secured, respectively, in fluid communication with the first and second passages of the third cylinder, said third cylinder being constructed, secured and configured for receiving food from either or both said first and second cylinders of said first and second cylinder and piston ram valve assemblies; and
a third piston having proximal and distal ends and being reciprocally movable in the third cylinder from an open position wherein food flows into the third cylinder through said passages and a closed position wherein the respective piston closes said passages and substantially fully occupies the third cylinder for thereby forcing substantially all of the food out of the nozzle of the third cylinder; and
a control system for controlling the operation of the machine, said control system comprising:
first, second and third position signaling means for producing an OPEN electrical signal indicating the open position of each of the first, second and third ram valves respectively and a CLOSED electrical signal indicating the closed position of the first, second, and third ram valves, respectively; and means for selectively opening, at the same time, only the first and third ram valves, or only the second and third ram valves, or all of the first, second and third ram valves to thereby dispense, selectively, food product from the first mixing container, or from the second mixing container, or from both the first and second containers.

2. The dispenser of claim 1 wherein said control means further comprises:

means for purging food from each of said first and second dispensers; and means for sanitizing each of said first and second dispensers.

3. A soft, viscous food dispenser for dispensing two such foods selectively on e at a time or both together at the same time comprising:

first and second containers for such foods;

a first piston and cylinder ram valve assembly in fluid communication with the first container;

a second piston and cylinder ram valve assembly in fluid communication with the second container;

said first and second piston and cylinder ram valve assemblies each comprising a cylinder having proximal and distal ends, each said cylinder being in fluid communication with its respective container for receiving food therefrom;

a third piston and cylinder ram valve assembly connected to food dispensing portions of both said first and said second piston and cylinder ram valve assemblies and comprising a cylinder having a proximal end and a distal end, the distal end thereof defining a product dispensing nozzle;

said cylinder of said third piston and cylinder ram valve assembly having a first opening therein superior to said product dispensing nozzle, said first opening located at a distal end of said cylinder of said first piston and cylinder ram valve assembly;

said cylinder of said third piston and cylinder ram valve assembly having a second opening therein superior to said product dispensing nozzle, said second opening located at a distal end of said cylinder of said second piston and cylinder ram valve assembly;

wherein said cylinders of both said first and second piston and cylinder ram valve assemblies are secured, respectively, in fluid communication with said first and second openings in said cylinder of said third piston and cylinder ram valve assembly;

the third piston having proximal and distal ends and being reciprocally movable in its associated cylinder from an open position where food can flow into this cylinder through at least one of said first and second openings and a closed position where the third piston closes each of said first and second openings and substantially fully occupies this cylinder for thereby forcing substantially all of the food out of the nozzle of this cylinder; and control system means for selectively opening and closing each said piston and cylinder ram valve assemblies;

said control system means comprising position indicator means associated with each respective piston of each said piston and cylinder ram valve assembly for position indication of each piston of each said piston and cylinder ram valve assembly, and switch means actuated by said piston indicator means for producing a first electrical signal when the respective ram valve is in an open position and a second electrical signal when the respective ram valve is a closed position.

4. The dispenser of claim 3 wherein each of the respective cylinders in each respective piston and cylinder ram valve assembly is constructed and configured to define an O-ring receiving groove proximate the position of the distal end of each respective piston when each said piston is in the open position, and an O-ring received in said groove forming a fluid tight seal between each cylinder and its respective piston.

5. A method for dispensing two soft, viscous foods selectively one at a time or both together at the same time comprising the following steps:

providing a first dispenser for one kind of frozen food, said first dispenser comprising:

a reservoir for receiving liquid mix to be frozen;

a mixing container comprising refrigeration means and mixing means for receiving and freezing said liquid mix to form a viscous frozen food product;

a first cylinder and piston ram valve assembly, said first assembly comprising:

a first cylinder having proximal and distal ends, said first cylinder being in fluid communication with the mixing container for receiving food therefrom; and a first piston having proximal and distal ends reciprocally movable in the first cylinder from an open position wherein frozen food flows through into the first cylinder and out the distal end thereof to be dispensed and a closed position wherein the first piston prevents food from flowing into the first cylinder and substantially fully occupies the first cylinder for thereby forcing substantially all of the food out of the first cylinder;

providing a second dispenser for another kind of frozen food, said second dispenser comprising:

a reservoir for receiving liquid mix to be frozen;

a second mixing container comprising refrigeration means and mixing means for receiving and freezing said liquid mix to form a viscous frozen food product;

a second cylinder and piston ram valve assembly, said second assembly comprising:

a second cylinder having proximal and distal ends, said second cylinder being in fluid communication with the second mixing container for receiving food therefrom; and a second piston having proximal and distal ends reciprocally movable in the second cylinder from an open position wherein frozen food flows through into the second cylinder and out the distal end thereof to be dispensed and a closed position wherein the second piston prevents food from flowing into the second cylinder and substantially fully occupies the second cylinder for thereby forcing substantially all of the food out of the second cylinder; and providing a third piston and cylinder ram valve assembler comprising:

a third cylinder having a proximal end and a distal end, the distal end defining a product dispensing nozzle, said third cylinder being so constructed as to define first and second passages through the wall thereof, and wherein each said first and second cylinder of said first and second cylinder and piston ram valve assemblies is secured, respectively, in fluid communication with the first and second passages of the third cylinder, said third cylinder being constructed, secured and configured for receiving food from either or both said first and second cylinders of said first and second cylinder and piston ram valve assemblies; and a third piston having proximal and distal ends and being reciprocally movable in the third cylinder from an open position wherein food flows into the third cylinder through said passages and a closed position wherein the respective piston closes said passages and substantially full occupies the third cylinder for thereby forcing substantially all of the food out of the nozzle of the third cylinder; and providing a control system for controlling the operation of the machine, said control system comprising:

first, second and third position signaling means for producing an OPEN electrical signal indicating the open position of each of the first, second and third ram valves respectively and a CLOSED electrical signal indicating the closed position of the first, second, and third ram valves, respectively; and means for selectively opening, at the same time, only the first and third ram valves, or only the second and third ram valves, or all of the first, second and third ram valves to thereby dispense, selectively, food product from the first mixing container, or from the second mixing container, or from both the first and second containers.

6. The method of claim 5 wherein said step of providing said control means further comprises the steps of:

providing means for purging food from each of said first and second dispensers; and providing means for sanitizing each of said first and second dispensers.

7. A method for dispensing two soft, viscous foods selectively one at a time or both together at the same time comprising the following steps:

providing first and second containers for such foods;

providing a first piston and cylinder ram valve assembly in fluid communication with the first container;

providing a second piston and cylinder ram valve assembly in fluid communication with the second container;

said first and second piston and cylinder ram valve assemblies each comprising a cylinder having proximal and distal ends, each said cylinder being in fluid communication with its respective container for receiving food therefrom;

providing a third piston and cylinder ram valve assembly connected to food dispensing portions of both said first and said second piston and cylinder ram valve assemblies and comprising a cylinder having a proximal end and a distal end, the distal end thereof defining a product dispensing nozzle;

said cylinder of said third piston and cylinder ram valve assembly having a first opening therein superior to said product dispensing nozzle, said first opening located at a distal end of said cylinder of said first piston and cylinder ram valve assembly;

said cylinder of said third piston and cylinder ram valve assembly having a second opening therein superior to said product dispensing nozzle, said second opening located at a distal end of said cylinder of said second piston and cylinder ram valve assembly;

wherein said cylinders of both said first and second piston and cylinder ram valve assemblies are secured, respectively, in fluid communication with said first and second openings in said cylinder of said third piston and cylinder ram valve assembly;

the third piston having proximal and distal ends and being reciprocally movable in its associated cylinder from an open position where food can flow into this cylinder through at least one of said first and second openings and a closed position where the third piston closes each of said first and second openings and substantially fully occupies this cylinder for thereby forcing substantially all of the food out of the nozzle of this cylinder; and providing control system means for selectively opening and closing each said piston and cylinder ram valve assemblies;

said control system means comprising position indicator means associated with each respective piston of each said piston and cylinder ram valve assembly for position indication of each piston of each said piston and cylinder ram valve assembly, and switch means actuated by said piston indicator means for producing a first electrical signal when the respective ram valve is in an open position and a second electrical signal when the respective ram valve is a closed position.

8. The method of claim 7 wherein each of the respective cylinders in each respective piston and cylinder ram valve assembly is constructed and configured to define an O-ring receiving groove proximate the position of the distal end of each respective piston when each said piston is in the open position, and an O-ring received in said groove forming a fluid tight seal between each cylinder and its respective piston.

* * * * *